US008402127B2

(12) United States Patent  
Solin

(10) Patent No.: US 8,402,127 B2  
(45) Date of Patent: Mar. 19, 2013

(54) SYSTEM AND METHOD FOR OFFERING VIRTUAL PRIVATE CLOUDS WITHIN A PUBLIC CLOUD ENVIRONMENT

(75) Inventor: David A. Solin, Austin, TX (US)

(73) Assignee: BMC Software, Inc., Houston, TX (US)

( * ) Notice: Subject to any disclaimer, the term of this patent is extended or adjusted under 35 U.S.C. 154(b) by 203 days.

(21) Appl. No.: 12/895,505

(22) Filed: Sep. 30, 2010

(65) Prior Publication Data

US 2011/0320598 A1    Dec. 29, 2011

Related U.S. Application Data

(60) Provisional application No. 61/359,243, filed on Jun. 28, 2010.

(51) Int. Cl.  
*G06F 15/173* (2006.01)

(52) U.S. Cl. ......... 709/223; 709/224; 709/227; 709/229

(58) Field of Classification Search .................. 709/223, 709/224, 227, 229  
See application file for complete search history.

(56) References Cited

U.S. PATENT DOCUMENTS

| | | | | |
|---|---|---|---|---|
| 6,880,002 B2 * | 4/2005 | Hirschfeld et al. | ........... | 709/223 |
| 8,122,282 B2 * | 2/2012 | Betzler et al. | .................. | 714/4.1 |
| 2010/0027552 A1 * | 2/2010 | Hill | ............................... | 370/401 |
| 2010/0042720 A1 * | 2/2010 | Stienhans et al. | ............. | 709/226 |
| 2010/0268764 A1 * | 10/2010 | Wee et al. | ..................... | 709/203 |
| 2011/0055385 A1 * | 3/2011 | Tung et al. | .................... | 709/224 |
| 2011/0055399 A1 * | 3/2011 | Tung et al. | .................... | 709/226 |
| 2011/0093847 A1 * | 4/2011 | Shah | ................................. | 718/1 |
| 2011/0126197 A1 * | 5/2011 | Larsen et al. | ..................... | 718/1 |
| 2011/0209064 A1 * | 8/2011 | Jorgensen et al. | ............. | 715/733 |
| 2011/0219372 A1 * | 9/2011 | Agrawal et al. | .................. | 718/1 |
| 2011/0258621 A1 * | 10/2011 | Kern | ................................. | 718/1 |
| 2011/0302304 A1 * | 12/2011 | Baumback et al. | ........... | 709/224 |
| 2012/0054731 A1 * | 3/2012 | Aravamudan et al. | ........ | 717/170 |
| 2012/0110056 A1 * | 5/2012 | Van Biljon et al. | ........... | 709/201 |
| 2012/0113270 A1 * | 5/2012 | Spracklen | ..................... | 348/194 |
| 2012/0131195 A1 * | 5/2012 | Morgan | ........................ | 709/226 |

* cited by examiner

*Primary Examiner* — Lashonda Jacobs

(57) ABSTRACT

Systems, methods and computer readable media for providing virtual private clouds within a public cloud are described. Examples include a method wherein a service provider deploys a primary instance of a cloud-in-a-box (CIAB) to his cloud computing system to create a public cloud. A CIAB includes adapters configured to manage virtual infrastructure of the cloud, and end-user portal and an administrative portal. A nested instance of CIAB may be deployed to one of the virtual machines, with one of the adapters of the nested instance of CIAB being connected to the end-user portal of the primary instance. An administrator of the nested instance may create his own library of virtual machine images and offer the library to the end-users of the nested CAIB instance.

16 Claims, 5 Drawing Sheets

SYSTEM AND METHOD FOR OFFERING VIRTUAL PRIVATE CLOUDS WITHIN A PUBLIC CLOUD ENVIRONMENT

CROSS-REFERENCE TO RELATED APPLICATIONS

This Application claims priority to U.S. Provisional Application Ser. No. 61/359,243 entitled "System and Method for Offering Virtual Private Clouds within a Public Cloud Environment" filed Jun. 28, 2010, which is hereby incorporated by reference in its entirety.

BACKGROUND

This disclosure relates generally to the field of cloud computing. More particularly, but not by way of limitation, it relates to methods and systems for offering virtual private clouds within a public cloud environment.

In a cloud computing environment, service providers may want to have the capability to provide cloud infrastructure to meet the needs of different kinds of customers. One type of customer is a technical end-user, who wants to setup a virtual machine for his own purposes. Another type of customer is an IT organization who wants to setup up a virtual machine on behalf of his own end-users.

The first kind of customer may simply want to be able to choose from a library of machine images that are offered by the service provider, and also potentially provide some of his own. He may or may not have his own standards to which he wants these machines to adhere—but is willing to take on the burden of managing his virtual machines himself.

The second kind of customer, an IT administrator, wants to be able to treat his end-user's machines like an extension of his own internal data center. Therefore, he will want to apply his own organization's standards to the images that his end-users select. For instance, he may only want to offer images that include his choice of systems management software so that the organization's patching levels and security configurations can be enforced. The IT administrator may also want his end-users to be able to access a self-service portal in order to create virtual machines, in much the same way that the first kind of customer does. This type of end-user would only be able to choose images according to policies that have been established by the IT administrator. A cloud administrator may also want to subdivide the virtual infrastructure underpinning the cloud in order to make it available to different kinds of customers. For example, a cloud administrator may divide the virtual infrastructure according to classes of service and/or geography.

While one means to provide the above identified capabilities is to create one or more portal applications backed by a sophisticated entitlements database and, possibly, creating multiple clouds that are accessible by different customers, such an approach is complex and does not scale well. Therefore, there is a need for a simpler, more elegant mechanism to provide the above discussed functionality.

SUMMARY

Various embodiments disclose systems, methods and computer readable media that provide virtual private clouds within a public cloud environment. In one embodiment, a cloud-in-a-box system is disclosed. The cloud-in-a-box system comprises adapters configured to provide tools for a system administrator to manage the cloud's virtual infrastructure, wherein one of the adapters configured to recognize the cloud-in-a-box system is itself a type of virtual infrastructure. Also included in this embodiment is an end-user portal which provides the system's end-users access to a library of virtual machine images in the cloud, an administrative portal that can allow an administrator to connect to the system to manage the virtual infrastructure and a library configured to provide managed resources to end-users.

In another embodiment, a method is disclosed offering private virtual clouds within a public cloud using a cloud-in-a-box system. The method comprises deploying a first cloud-in-a-box system into a cloud-computing environment to create a public cloud. The method further includes managing virtual infrastructure through an adapter of the cloud-in-a-box system; deploying a second cloud-in-a-box system into the cloud-computing environment; connecting an adapter of the second cloud-in-a-box system to an end-user portal of the first cloud-in-a-box; uploading images to the library of the second cloud-in-a-box; and offering the library of the second cloud-in-a-box to end-users.

In yet another embodiment, a virtual infrastructure management system is disclosed that includes a processor, a storage subsystem coupled to the processor, and a software program, application or module stored in the storage subsystem, comprising instructions that when executed by the processor cause the processor to perform one of the methods described above.

In still another embodiment, a non-transitory computer readable medium is disclosed wherein the non-transitory computer readable medium (i.e., a program storage device) has instructions for causing a programmable control device to perform one of the methods described above.

In yet another embodiment, a networked computer system is disclosed that includes a plurality of computers communicatively coupled, at least one of the plurality of computers programmed to perform at least a portion of a method described above wherein the entire method is performed collectively by the plurality of computers.

DETAILED DESCRIPTION

Figure 1:
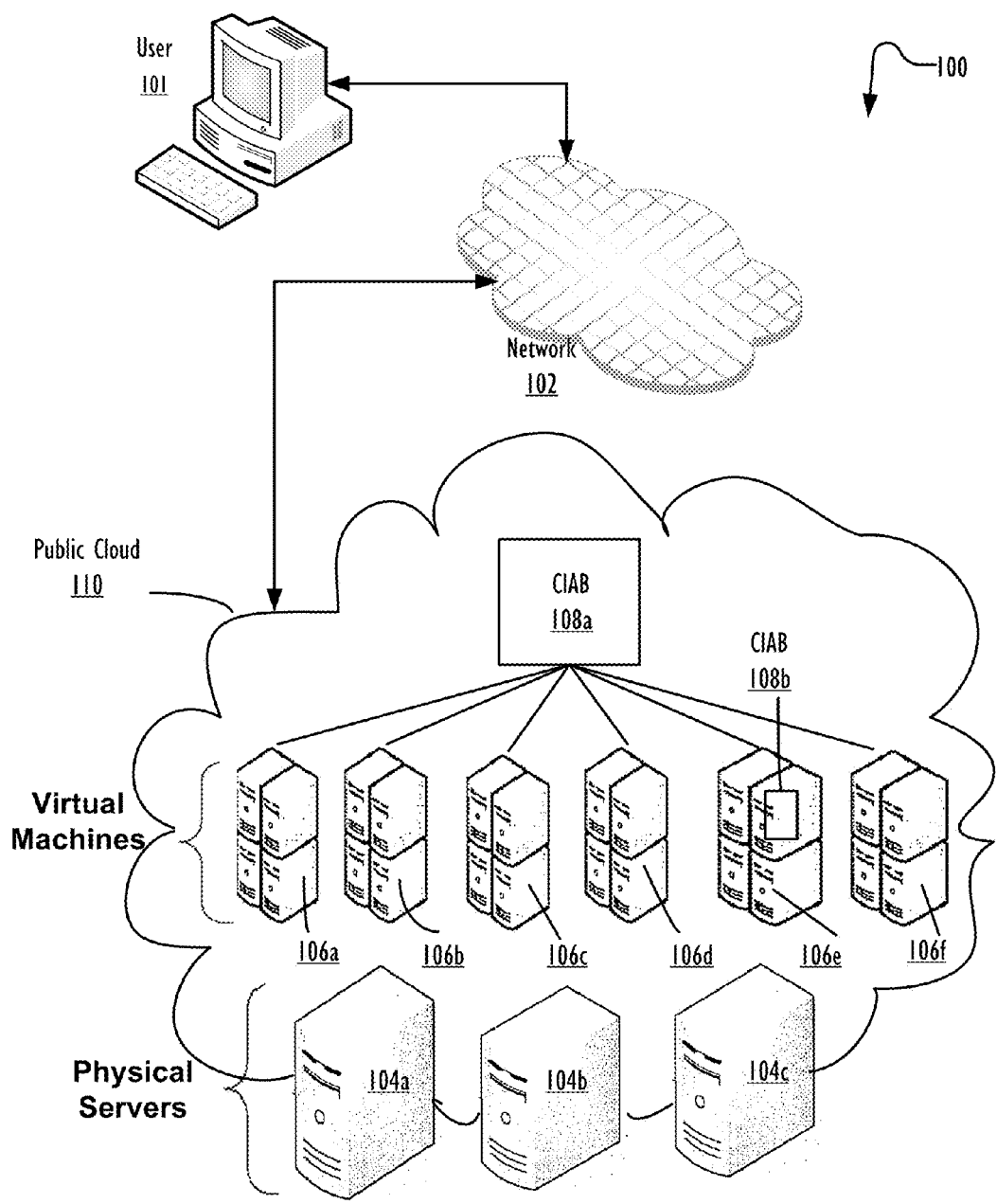
FIG. 1 illustrates an example cloud computing architecture.

Various embodiments disclose systems, methods and computer readable media that provide virtual private clouds within a public cloud. According to one embodiment, a cloud-in-a-box (CIAB) system comprises adapters configured to provide tools for an administrator to manage a cloud's virtual infrastructure. One of the adapters may be configured to know how to use the CIAB system itself as a type of virtual infrastructure. CIAB systems in accordance with this disclosure can provide an end-user portal for end-users to access a library of virtual machine images in the cloud, and an administrative ("admin") portal for an administrator to connect to the system to manage the virtual machine images. These portals may be backed by service APIs to facilitate integration with third-party systems. In one embodiment, a service provider can deploy a CIAB system into his environment to create a primary instance of the CIAB (the public cloud). A second CIAB may be installed into the environment (such as a virtual machine instance, a physical server, etc.) to create a nested instance of the CIAB. An administrator of the nested instance can connect a CIAB adapter to the end-user portal (or service API) of the primary instance. The administrator may also create his own library by either selecting from elements of the primary instance's library or by uploading his own images (or a combination of the two), and may limit end-users of the nested instance to access only his own library, thus resulting in a virtual private cloud.

In the following description, for purposes of explanation, numerous specific details are set forth in order to provide a thorough understanding of the invention. It will be apparent to one skilled in the art, however, that the invention may be practiced without these specific details. In other instances, structure and devices are shown in block diagram form in order to avoid obscuring the invention. It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the art having the benefit of this disclosure. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

FIG. 1 illustrates an example cloud computing architecture 100 where embodiments of the "cloud in a box" might be deployed. Cloud computing system 100 includes public cloud 110 coupled to network 102, which provides connectivity between cloud 110 and one or more users 101. Such connectivity may be provided via each system's network interface. Cloud 110 can include a plurality of resources. Illustrative resource include, but are not limited to, physical servers 104a, 104b and 104c, virtual machines 106a, 106b, 106c, 106d, 106e and 106f, virtual servers and/or virtual appliances. Although example cloud 110 shows only three physical servers and six virtual machines for simplicity purposes, any number of physical servers and virtual machines may be utilized.

Figure 2:
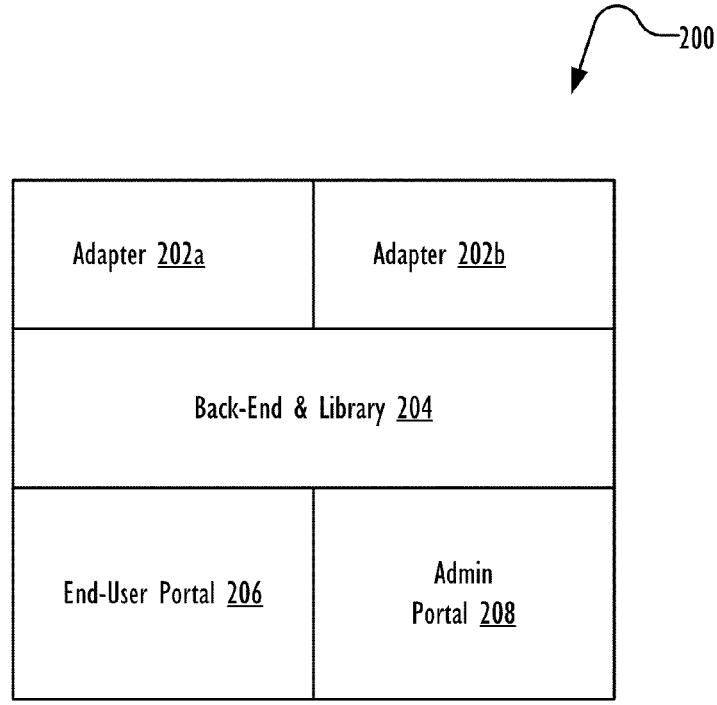
FIG. 2 illustrates an example "cloud-in-a-box" system.

FIG. 2 illustrates example cloud-in-a-box (CIAB) system 200 that uses adapters to manage different kinds of virtual infrastructure. CIAB 200 is a collection of functional blocks. Each functional block may be implemented as a separate software component, for example, using any number of conventional programming languages, including C, C++, Java, and so on. Furthermore, it will be appreciated by those skilled in the art that an embodiment of the invention may not require every functional block shown in FIG. 2, or may include additional functional blocks which have been left out of FIG. 2 to avoid obscuring the disclosed embodiment with unnecessary detail. Software code modules implementing the functional blocks and representing cloud-in-a-box module system 200 may reside and execute on a single server, or may be distributed in some meaningful manner to reside and execute on multiple servers.

As noted above, CIAB system 200 includes a set of adapters. Adapters 202a and 202b are shown in FIG. 2 for illustrative purpose. Adapter 202a may be configured to make service calls to manage a cloud's virtual infrastructure, such as creating a virtual machine, removing a virtual machine and cloning a virtual machine, etc. Adapter 202b may be configured to recognize the CIAB itself as a type of virtual infrastructure.

In general, CIAB system 200 recognizes two kinds of users: end-users and administrators. CIAB system 200 can include two sets of portals for these two kinds of users: end-user portal 206 for end-users and admin portal 208 for administrators. CIAB system 200 may also include back-end and library 204. Administrators may configure resource pools (groups of resources associated with arbitrary parameters) and offerings in the form of machine images that can be deployed to managed resources. An administrator of a CIAB system is able to upload images into library 204 and advertise them to end-users. End-users of a CIAB system may access the library and request machine instances that are provisioned with images. End-user portal 206 may allow end-users to upload their own images; this permission may be disabled through an access control configuration setting.

In one embodiment, a service provider deploys a CIAB into his environment (e.g., on physical server 106); this will be referred to as the primary instance of the CIAB. Referring back to FIG. 1, CIAB 108a is a primary instance of a cloud-in-the-box. A CIAB system may also be deployed on a virtual machine instance inside the service provider's virtual infrastructure (this creates a nested instance of the CIAB), as shown in CIAB 108b of FIG. 1. A nested instance of CIAB may also be deployed onto a physical server.

Figure 3:
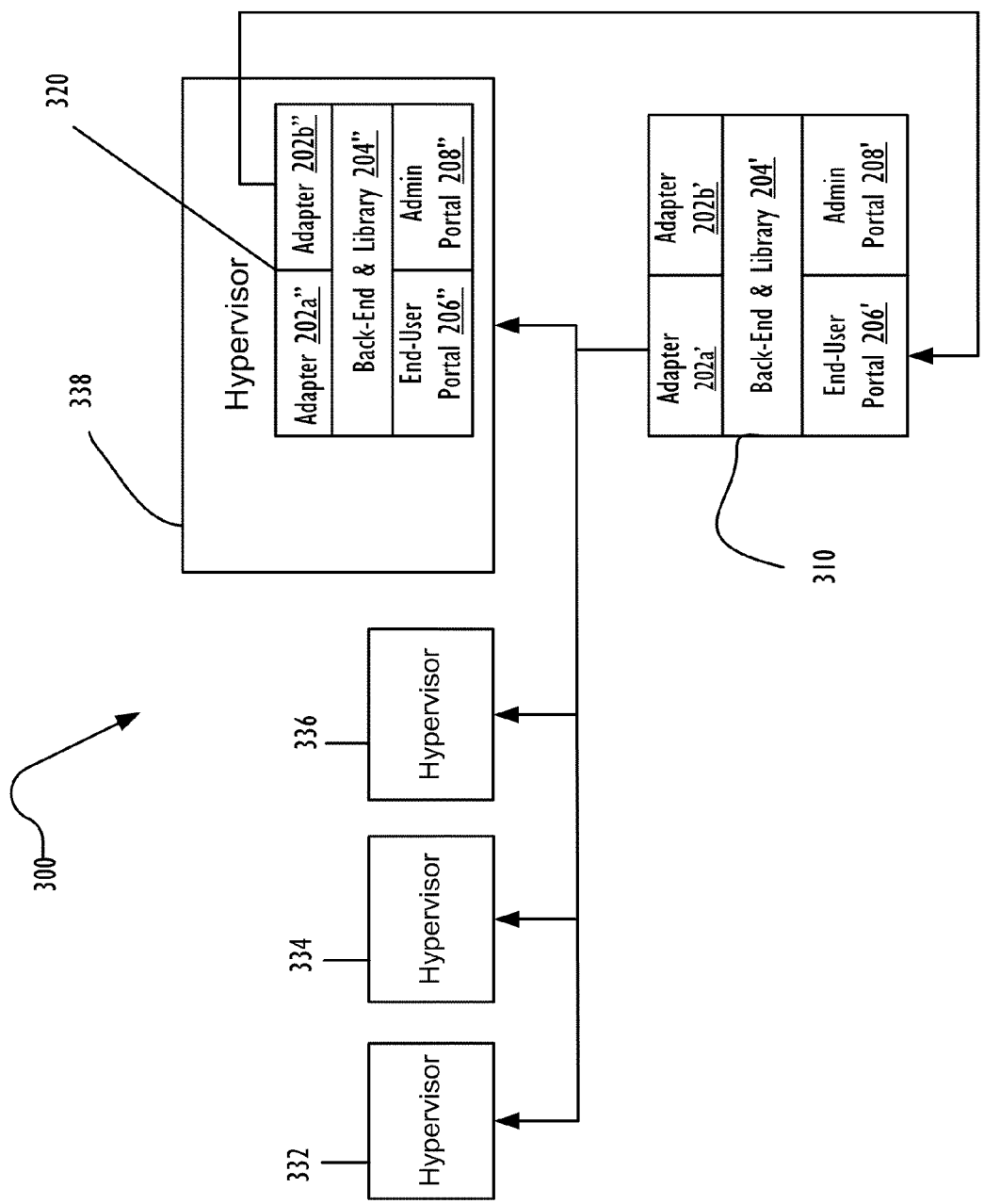
FIG. 3 illustrates, in a block diagram, an example environment having both a primary instance and a nested instance of a "cloud-in-a-box" system deployed according to one embodiment.

FIG. 3 illustrates, in a block diagram, example cloud environment 300 where the primary instance of CIAB 310 and a nested instance of CIAB 320 are both deployed. Adapter 202a' of CIAB 310 is connected to virtual machines 332, 334, 336 and 338. The number of virtual machines shown in FIG. 3 is for illustrative purpose only. An administrator of the cloud 300 may create a new virtual machine, clone a virtual machine or remove a virtual machine. An administrator of CIAB 310 (typically an administrator of the service provider) can access CIAB 310 through admin portal 208'. An end-user of primary CIAB instance 310 can access cloud 300 through end-user portal 206'. An end-user of primary CIAB instance 310 has access to a library of virtual machines hosted by the service provider. The primary CIAB instance 310 may also allow an end-user to upload additional images to his own library and/or create his own virtual machine instances via adapter 202a' of CIAB 310.

As shown in FIG. 3, nested CIAB instance 320 is deployed inside virtual machine 338. A nested instance may also be deployed to a physical server. Adapter 202b" of nested CIAB instance 320 may be hooked up to end-user portal 206' of the primary CIAB instance 310. The connection between adapter 202b" of CIAB 320 and end-user portal 206' of CIAB 310 may also be accomplished through web-services, or any other interface that comprise the API used by the end-user portal. As described earlier, adapter 202b" can be configured to recognize a CIAB itself as a type of virtual infrastructure. The connection between adapter 202b" of CIAB 320 and end-user portal 206' allows adapter 202b" to recognize CIAB 310 itself as a part of the virtual infrastructure. Since CIAB 320 is connected to end-user portal 206' of CIAB 310, CIAB 320 is also an end-user of primary CIAB instance 310.

As an end-user of primary CIAB instance 310, an administrator of nested CIAB instance 320 can create its own "user image library" (in the primary CIAB instance 310) by uploading the administrator's images, as shown in library 204" of CIAB 320 in FIG. 3. The administrator may also select images from the service provider's library into his own library. Adapter 202a" of CIAB 320 may then use this library of virtual machine images to fulfill provisioning requests in the primary CIAB instance 310 from end-users of the nested CIAB instance 320.

In one embodiment, an access control system is implemented to control the accesses of CIAB 320's end-users. In one embodiment, end-users of CIAB 320 may have access to both library 204' of primary CIAB instance 310 and library 204" of nested CIAB instance 320. In another embodiment, end-users of CIAB 320 may be configured to access CIAB 320's library only, with no access to the service provider's library.

In one embodiment, an IT administrator of an organization is the administrator of a nested instance of CIAB. The IT administrator can create his own library of virtual machine images that conform to his organization's own standards, and his end-users can access the end-user portal of this nested instance. The administrator of the nested instance may configure the end-user portal to disallow uploading of images. The administrator of the nested instance may configure the CIAB adapter to ignore the service provider's image library in the primary instance. These configurations allows an administrator to treat his end-user's machines like an extension of his own internal data center, and apply his own organization's standards to the images that his end-users may select.

Figure 4:
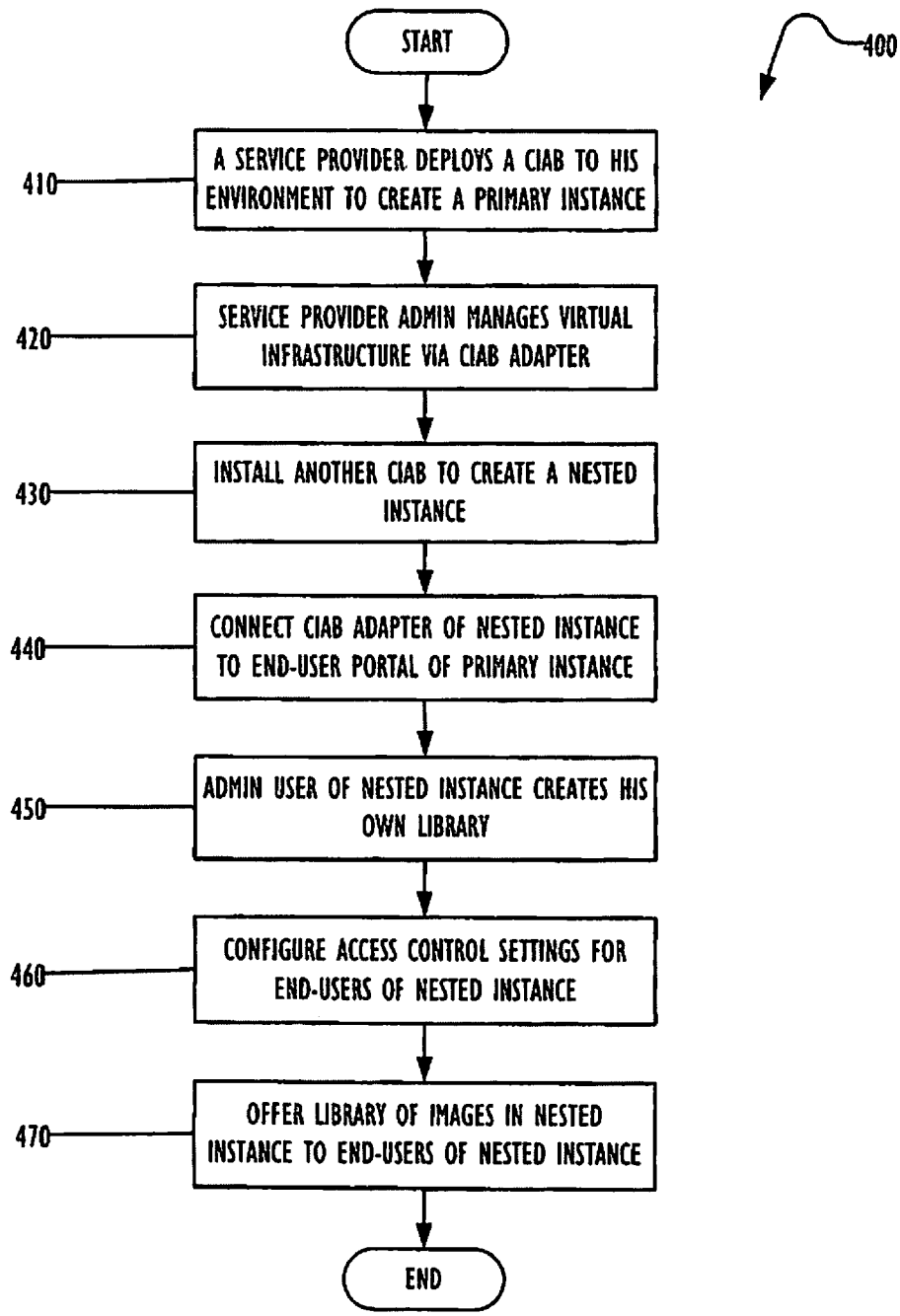
FIG. 4 illustrates, in flowchart form, a method for offering private clouds within a public cloud according to one embodiment.

FIG. 4 illustrates one embodiment of method 400 for offering private clouds within a public cloud. At block 410, a service provider deploys a CIAB system into his cloud computing environment to create a public cloud, the primary instance of CIAB. A service provider administrator manages virtual infrastructure of the cloud through the CIAB adapter, block 420. The service provider administrator connects to the CIAB through an admin portal to manage the virtual infrastructure, such as creating a new virtual machine, cloning a virtual machine or removing a virtual machine, etc. An administrator of the service provider may also upload images to a library.

The service provider may install another instance of CIAB system on a virtual machine instance (or a physical server) to create a nested instance of CIAB, block 430. At block 440, a CIAB adapter of the nested instance is connected to the end-user portal of the primary instance so that the nested instance becomes an end-user of the primary instance. An IT administrator of an organization connects to the nested instance of CIAB as an administrator. The IT administrator uploads his own images to create his own library for the organization, block 450. In one embodiment, the IT administrator may also select images from a library of the primary instance into his own library. The IT administrator (the administrative user of the nested instance) may restrict access of his own end-users, such as disallowing the end-users' access to the service provider's library, or preventing end-users to upload their self-generated images, etc, block 460. The IT administrator may then offers his own library of virtual machine images as a virtual private cloud to the end-users within his own organization, block 470.

Figure 5:
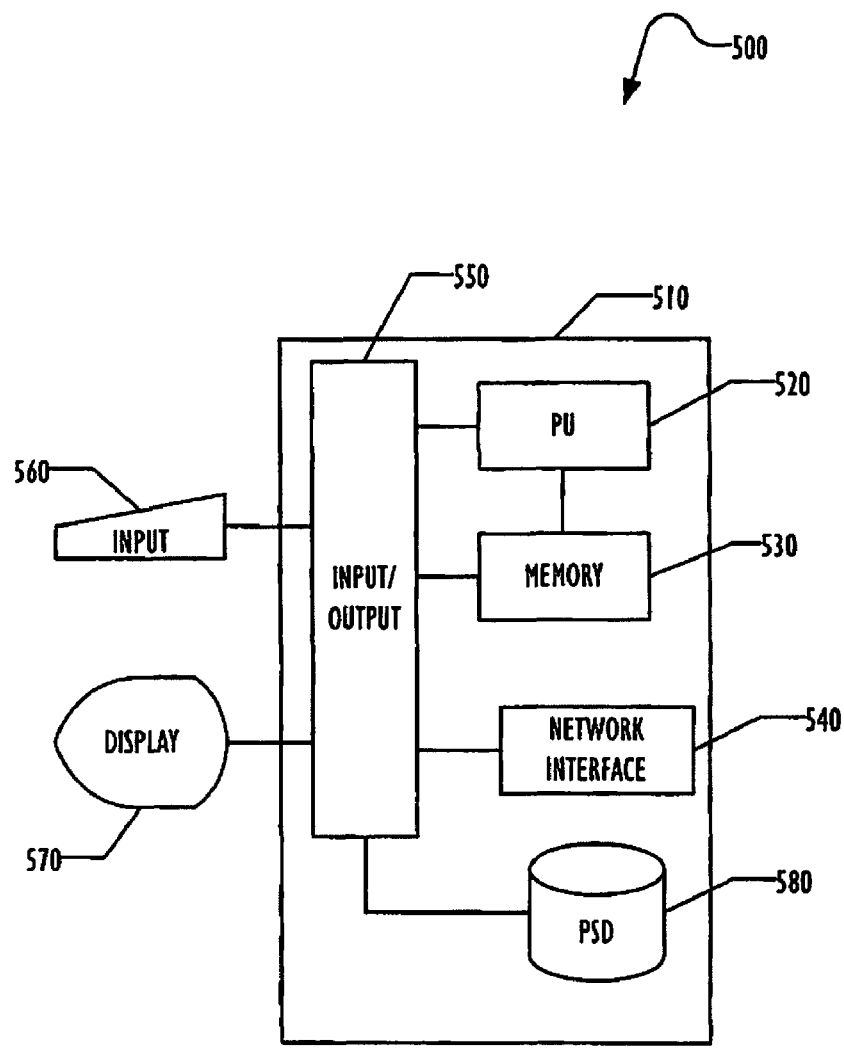
FIG. 5 illustrates, in block diagram form, an example computer system which might be utilized to implement various embodiments disclosed herein.

Referring now to FIG. 5, example computer system 500 is shown. Example computer system 500 may be used as a managed resource within the cloud environment, such as physical servers 104 and virtual machine 106. Example computer 500 comprises system unit 510 which may be optionally connected to input device 560 (e.g., keyboard, mouse, touch screen, etc.) and display 570. Program storage device (PSD) 580 is included with system unit 510. Also included within system unit 510 is network interface 540 for communication via a network with other computing and corporate infrastructure devices (not shown). Network interface 540 may be included within system unit 510 or be external to system unit 510. In either case, system unit 510 may be communicatively coupled to network interface 540. Program storage device 580 represents any form of non-volatile storage including, but not limited to, all forms of optical and magnetic storage, including solid-state, storage elements and removable media. Program storage device 580 may be used for storage of software to control system unit 510 in, data for use by the computer 500, or both.

System unit 510 may be programmed to perform methods in accordance with this disclosure (an example of which is shown in FIG. 4). System unit 510 comprises processor unit (PU) 520, input-output (I/O) interface 550 and memory 530. Processing unit 520 may include any programmable controller device including, for example, one or more members of the Intel Atom®, Core®, Pentium® and Celeron® processor families from Intel and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Memory 530 may include one or more memory modules and comprise random access memory (RAM), read only memory (ROM), programmable read only memory (PROM), programmable read-write memory, and solid-state memory. One of ordinary skill in the art will also recognize that PU 520 may also include some internal memory including, for example, cache memory.

In addition, acts in accordance with the methods of FIG. 4 may be performed by example computer system 500 including a single computer processor, a special purpose processor (e.g., a digital signal processor, "DSP"), a plurality of processors coupled by a communications link or a custom designed state machine, or other device capable of executing instructions organized into one or more program modules. Custom designed state machines may be embodied in a hardware device such as an integrated circuit including, but not limited to, application specific integrated circuits ("ASICs") or field programmable gate array ("FPGAs").

Various changes in the components as well as in the details of the illustrated operational method are possible without departing from the scope of the following claims. For example, the illustrative system of FIG. 2 may be comprised of more than one computer communicatively coupled via a communication network, wherein the computers may be mainframe computers, minicomputers, workstations or any combination of these. Further, monitored applications may execute on multiple hardware platforms. Such a network may be composed of one or more local area networks, one or more wide area networks, or a combination of local and wide-area networks. In addition, the networks may employ any desired communication protocol and further may be "wired" or "wireless." In addition, acts in accordance with FIG. 4 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A cloud computing system providing a virtual private cloud within a public cloud, the system comprising:
   a plurality of physical servers;
   a first instance of a cloud-in-a-box deployed to one of the plurality of physical servers;
   a plurality of virtual machines created by the first instance of a cloud-in-a-box; and
   a second instance of a cloud-in-a-box, the second instance of a cloud-in-a-box being a cloud-in-a-box instance nested with the first instance of a cloud-in-a-box and deployed to one of the plurality of physical servers,
   wherein each instance of a cloud-in-a-box comprises:
      one or more adapters configured to manage virtual infrastructure of a cloud,
   wherein one of the one or more adapters is configured to recognize a instance of a cloud-in-a-box itself as a type of virtual infrastructure,
      a library configured to store virtual machine images,
      an end-user portal configured to provide an end-user access to the library, and
      an admin portal configured to provide management functionality for an administrative-user,
   wherein an adapter of the second instance of a cloud-in-a-box is communicatively coupled to an end-user portal of the first instance of a cloud-in-a-box.

2. The cloud computing system of claim 1, wherein the second instance of a cloud-in-a-box is deployed on one of the plurality of virtual machines.

3. The cloud computing system of claim 1, wherein end-users of the second instance of a cloud-in-a-box are not allowed to access a library of the first instance of a cloud-in-a-box.

4. The cloud computing system of claim 1, wherein a library of the second instance of a cloud-in-a-box comprises images uploaded by an administrator of the second instance of a cloud-in-a-box.

5. The cloud computing system of claim 1, wherein a library of the second instance of a cloud-in-a-box comprises images selected from the library of the first instance of a cloud-in-a-box by an administrator of the second instance of a cloud-in-a-box.

6. The cloud computing system of claim 1, wherein end-users of the second instance of a cloud-in-a-box are not allowed to upload virtual machine images to create their own library.

7. The cloud computing system of claim 1, wherein an end-user of the first instance of a cloud-in-a-box can upload images to create his own library.

8. The cloud computing system of claim 1, wherein the management functionality available to an administrative-user of each instance of a cloud-in-a-box comprises uploading images to a library of the each instance of cloud-in-a-box and advertising the images to end-users of the each instance of a cloud-in-a-box.

9. The cloud computing system of claim 1, wherein the management functionality available to an administrative-user of each instance of a cloud-in-a-box comprises creating a virtual machine or cloning a virtual machine.

10. A method for providing a virtual private cloud within a public cloud in a cloud computing environment, the method comprising,
   deploying a first instance of a cloud-in-a-box on a server of a plurality of physical servers in the cloud computing system;
   creating one or more virtual machines through the first instance of a cloud-in-a-box;
   installing a second instance of a cloud-in-a-box, the second instance of a cloud-in-a-box being a cloud-in-a-box instance nested with the first instance of a cloud-in-a-box and deployed to one of the plurality of physical servers;
   connecting an adapter of the second instance of a cloud-in-a-box to an end-user portal of the first instance of a cloud-in-a-box;
   creating a library of images for the second instance of a cloud-in-a-box; and
   providing the library of the second instance to end-users of the second instance of a cloud-in-a-box,
   wherein each instance of a cloud-in-a-box comprises:
      one or more adapters configured to manage virtual infrastructure of a cloud, wherein one of the one or more adapters is configured to recognize a instance of a cloud-in-a-box itself as a type of virtual infrastructure,
      a library configured to store virtual machine images,
      an end-user portal configured to provide an end-user access to the library, and
      an admin portal configured to provide management functionality for an administrative-user.

11. The method of claim 10 further comprising configuring access control settings to disable the end-users of the second instance of a cloud-in-a-box to access a library of the first instance of a cloud-in-a-box.

12. The method of claim 10 further comprising configuring access control settings to disable end-users of the second instance of a cloud-in-a-box to upload images.

13. The method of claim 10, wherein the act of installing a second instance of a cloud-in-a-box comprises installing the second instance of a cloud-in-a-box on one of the one or more virtual machines.

14. The method of claim 10, wherein the act of creating a library of images for the second instance of a cloud-in-a-box comprises uploading images to a library of the second instance of a cloud-in-a-box, wherein the images conform to a preset standard.

15. A virtual infrastructure management system in a cloud computing environment, the virtual infrastructure management system comprising:

a processor;

a storage subsystem coupled to the processor; and a software module stored in the storage subsystem, the software module comprising instructions that when executed by the processor cause the processor to:

deploy a first instance of a cloud-in-a-box on a server of a plurality of physical servers in the cloud computing environment;

create one or more virtual machines through the first instance of a cloud-in-a-box;

install a second instance of a cloud-in-a-box, the second instance of a cloud-in-a-box being a cloud-in-a-box instance nested with the first instance of a cloud-in-a-box and deployed to one of the plurality of physical server;

connect an adapter of the second instance of a cloud-in-a-box to an end-user portal of the first instance of a cloud-in-a-box;

create a library of images for the second instance of a cloud-in-a-box; and provide the library of the second instance to end-users of the second instance of a cloud-in-a-box, wherein each instance of a cloud-in-a-box comprises:
one or more adapters configured to manage virtual infrastructure of a cloud, wherein one of the one or more adapters is configured to recognize a instance of a cloud-in-a-box itself as a type of virtual infrastructure,
a library configured to store virtual machine images,
an end-user portal configured to provide an end-user access to the library, and
an admin portal configured to provide management functionality for an administrative-user.

16. A non-transitory computer readable medium having programmed instructions stored thereon for causing a processor to:

deploy a first instance of a cloud-in-a-box on a server of a plurality of physical servers in a cloud computing environment;

create one or more virtual machines through the first instance of a cloud-in-a-box;

install a second instance of a cloud-in-a-box, the second instance of a cloud-in-a-box being a cloud-in-a-box instance nested with the first instance of a cloud-in-a-box and deployed to one of the plurality of physical server;

connect an adapter of the second instance of a cloud-in-a-box to an end-user portal of the first instance of a cloud-in-a-box;

create a library of images for the second instance of a cloud-in-a-box; and provide the library of the second instance to end-users of the second instance of a cloud-in-a-box, wherein each instance of a cloud-in-a-box comprises:
one or more adapters configured to manage virtual infrastructure of a cloud, wherein one of the one or more adapters is configured to recognize a instance of a cloud-in-a-box itself as a type of virtual infrastructure,
a library configured to store virtual machine images,
an end-user portal configured to provide an end-user access to the library, and
an admin portal configured to provide management functionality for an administrative-user.

* * * * *